Nov. 8, 1966 B. HONDALUS 3,284,590
AIR BREAK SWITCH AND A MOUNTING BASE THEREFOR
Original Filed Nov. 25, 1960 2 Sheets-Sheet 1
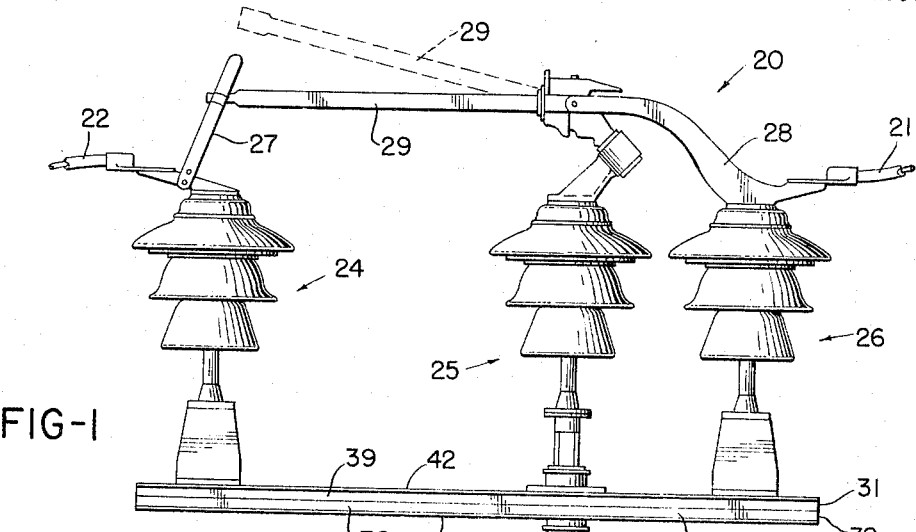
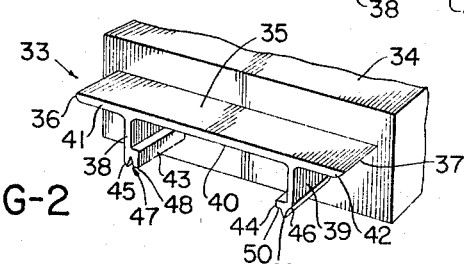
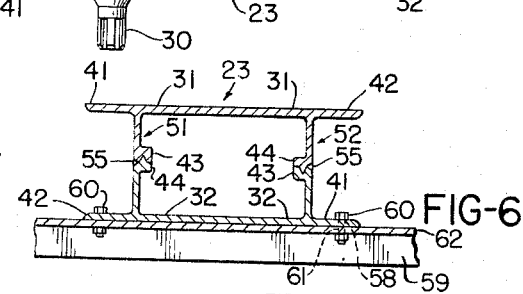
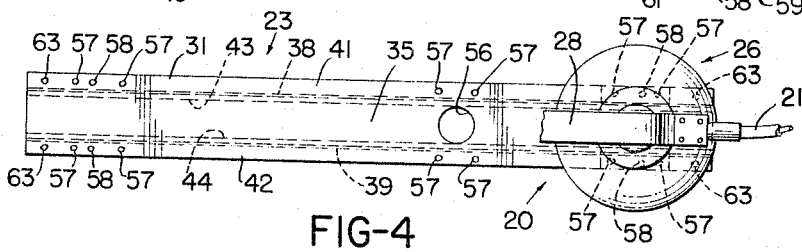
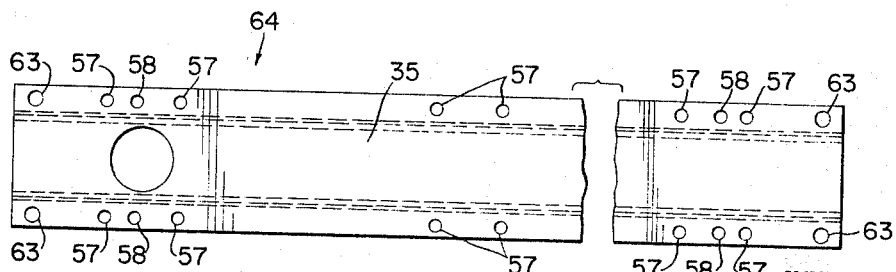
INVENTOR.
BUSH HONDALUS
BY
Glenn & Jackson
HIS ATTORNEYS Nov. 8, 1966   B. HONDALUS   3,284,590
AIR BREAK SWITCH AND A MOUNTING BASE THEREFOR
Original Filed Nov. 25, 1960   2 Sheets-Sheet 2
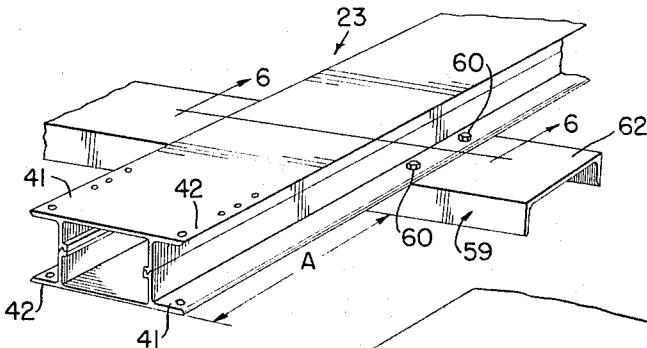
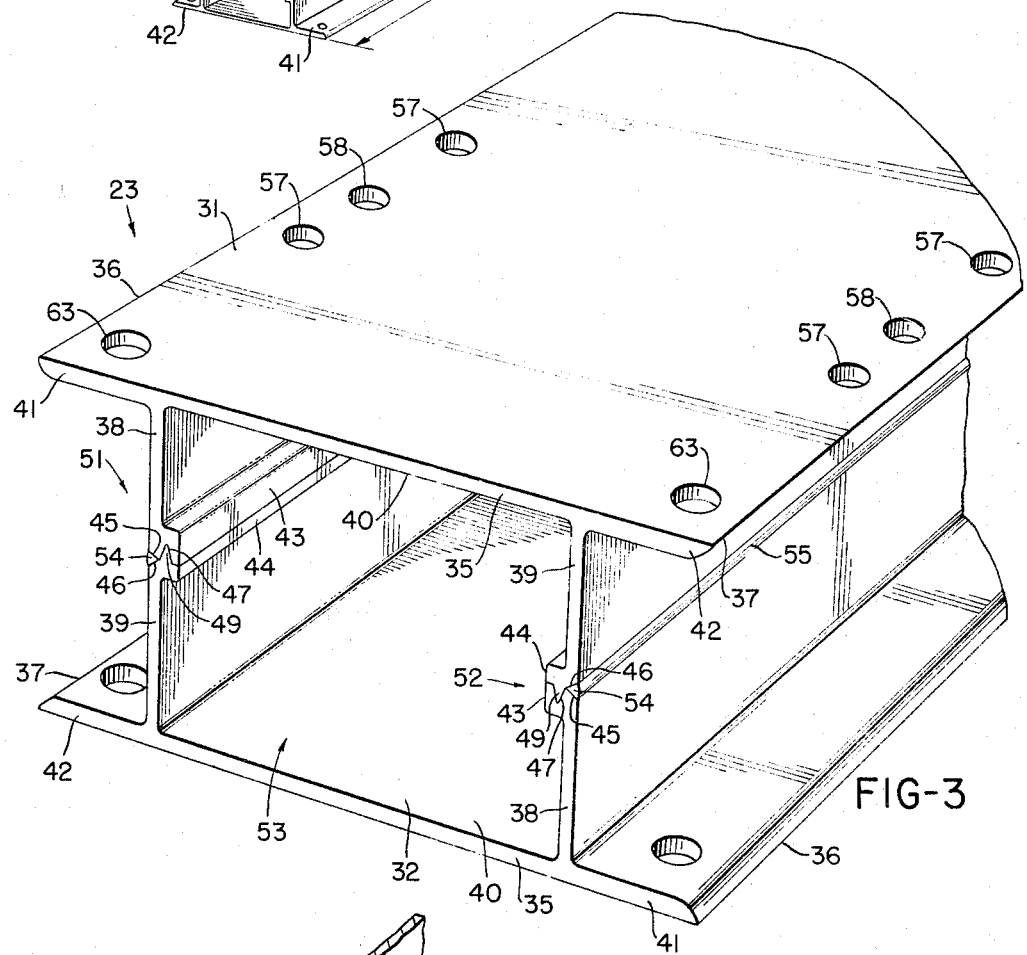
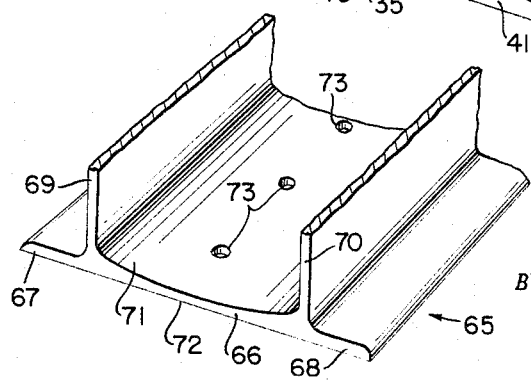
INVENTOR.
BUSH HONDALUS
BY Glenn & Jackson
HIS ATTORNEYS

United States Patent Office 3,284,590
Patented Nov. 8, 1966

3,284,590
AIR BREAK SWITCH AND A MOUNTING
BASE THEREFOR
Bush Hondalus, Bon Air, Va., assignor to Reynolds Metals Company, Richmond, Va., a corporation of Delaware
Continuation of application Ser. No. 71,467, Nov. 25, 1960. This application Aug. 4, 1965, Ser. No. 479,049
11 Claims. (Cl. 200—48)

This application is a continuation patent application of the copending patent application, Serial Number 71,467, filed November 25, 1960 now abandoned.

This invention relates to an improved structural base for an air break switch or the like, and to an improved method for making such a structural base or the like.

Heretofore, large switches for connecting and disconnecting high tension power lines and the like have been mounted on bases formed from elongated, inverted U-shaped, metal beams or the like. However, it has been found that when such switches become short-circuited, such as during storms and the like, a torsional force is created in the particular power line switch which causes excessive deflection of the base member thereof. Such deflection or twisting of the base causes excessive damage to the air break switch carried thereby whereby costly repairs and replacements must be subsequently made to the damaged air break switch.

In an attempt to compensate for such torsional forces imposed on the switch bases, the bases were formed of relatively thick and strong metal. However, the resulting bases were not only excessive in weight and costly but the same could not be formed economically of aluminum-containing metal and thereby required costly maintenance to prevent the same from rusting, corroding and the like.

According to the teachings of this invention, however, an improved base for an air break switch or the like is provided which not only has the structural strength to withstand high torsional forces imposed thereon but which is also light weight, non-corrosive, inexpensive, and relatively simple to manufacture.

In particular the structural base of this invention comprises a pair of base sections each having a mounting web provided with a pair of transverse webs interconnected thereto and extending therefrom in spaced relation relative to each other. The base sections are assembled together with the free ends of the transverse webs thereof disposed in abutting relation and being secured together to form the base whereby the interconnected transverse webs and mounting webs define a tubular structure extending throughout at least part of the length of the base to provide structural means to resist any high torsional forces imposed thereon.

Further, the transverse webs of the base sections are respectively disposed inboard in the side edges of the mounting webs to define mounting flanges that extend outwardly from the tubular structure to provide means for readily mounting the base to any desired supporting structure.

In the past, it has been found that the greater the length of the switch base that overhangs the basic supporting structure, the greater the resulting deflection of the base member during a short circuit condition. However, by following the teachings of this invention in the use of a very rigid box section member, the deflection of the base during a short circuit condition will be greatly reduced.

While the base sections of this invention can be formed in any desired manner, one method of this invention is to extrude an elongated base section stock from which the base sections for each base can be subsequently cut and joined together by the methods of this invention in a simple and effective manner.

Accordingly, it is an object of this invention to provide an improved structural base for an air break switch or the like and having one or more of the novel features of this invention set forth above or hereinafter shown or described.

Another object of this invention is to provide an improved method for making such a structural base or the like.

Another object of this invention is to provide an improved base section for such a structural base or the like.

Other objects, uses and advantages of this invention are apparent from a reading of this description which proceeds with reference to the accompanying drawings forming a part thereof and wherein:

FIGURE 1 is a schematic view illustrating an air break switch carried by a structural base of this invention.

FIGURE 2 is a schematic, perspective view illustrating one method of this invention for making the base sections of this invention.

FIGURE 3 is a fragmentary, enlarged perspective view of the structural base of this invention.

FIGURE 4 is a top view of the air break switch structure illustrated in FIGURE 1 and has part of the air break switch thereof broken away.

FIGURE 5 is a fragmentary side view of the structural base of this invention and illustrates one method of mounting the same to a supporting structure.

FIGURE 6 is a view similar to FIGURE 5 and illustrates another method of mounting the structural base of this invention to a supporting structure.

FIGURE 7 is a view similar to FIGURE 4 and illustrates another structural base of this invention.

While the features of this invention are hereinafter described as being particularly applicable to a structural base for an air break switch, it is to be understood that the structural base of this invention can be utilized for many other purposes, such as part of the structural frame of machines, buildings and the like. Accordingly, the structures and method of this invention as hereinafter claimed are not to be limited to only the application thereof illustrated in the drawings because the drawings are merely being utilized to illustrate one of the many uses of this invention.

Referring now to FIGURE 1, the reference numeral 20 generally indicates an air break switch for selectively connecting and disconnecting the pair of electrical conductors 21 and 22 in a manner well known in the art and not forming part of this invention, the air break switch 20 being carried by a structural base 23 which is the subject of the present invention.

While the air break switch 20 does not form part of this invention, sufficient details thereof will be described to illustrate the function of the structural base 23 of this invention.

In particular, the air break switch 20 comprises a plurality of insulator stacks 24, 25 and 26 respectively secured to the structural base 23 in a manner hereinafter described. The insulator stack 24 supports the conductor 22 above the base 23 and insulates the conductor 22 from the base 23, the conductor 22 being interconnected to a switching element 27 carried by the insulator stack 24. The insulator stack 26 supports the other conductor 21 above the base 23 and insulates the same therefrom, the conductor 21 being interconnected to switching member 28 carried by the insulator stack 26. The central insulator stack 25 supports a switch arm 29 above the base 23 and insulates the arm 29 therefrom, the switch arm being interconnected to the switching element 28 and being adapted to make electrical contact with the switching member 27 of the insulator stack 24 to interconnect the conductors 21 and 22 together when the arm 29 is disposed in the position illustrated in full lines in FIGURE 1.

A control mechanism 30 is carried by the insulator stack 25 and projects through the structural base 23, the control mechanism 30 being adapted to be rotated manually or automatically in a manner well known in the art to move the switch arm 29 between the position illustrated in full lines in FIGURE 1 and the position illustreated in dotted lines to selectively connect and disconnect the conductors 21 and 22. Since the switch arm 29 breaks contact with the switching member 27 in the air when the arm 29 is moved to the dotted position illustrated in FIGURE 1, the switch 20 is called "an air break switch."

As previously stated, when the conductors 21 and 22 are interconnected together by the switch arm 29 and a short circuited condition exists in the power line thereof, a torsional force is imposed by the switch 20 on the structural base 23 tending to cause deflection thereof. Should the base 23 be twisted or deflected by such torsional force when the switch arm 29 is in its closed position, excessive damage will result in the switch 20 requiring costly repairs and replacement of the parts thereof.

However, it has been found that if the base 23 is formed in accordance with the teachings of this invention, the structural base 23 can withstand such torsional forces and will not deflect to an adverse degree which would cause damage to the switch 20.

The structural base 23 of this invention is formed from a pair of base sections 31 and 32 secured together by the method of this invention and are cut from a length of base section stock 33, FIGURE 2, formed in any suitable manner and of any suitable material. The embodiment of the base member stock 33 illustrated in the drawings is formed from an aluminum-containing metal extruded by a conventional extruding apparatus 34 in a manner well known in the art.

The extruded stock 33 comprises a flat mounting web 35 having a pair of opposed parallel side edges 36 and 37 and having a pair of parallel transverse webs 38 and 39 integrally interconnected thereto and extending from the surface 40 thereof in spaced relation relative to each other. The transverse webs 38 and 39 are respectively disposed inboard of the side edges 36 and 37 of the mounting web 35 and cooperate therewith to define mounting flanges 41 and 42 of the mounting web 35. If desired, the mounting flanges 41 and 42 may be thicker in cross section than the portion of the mounting web 35 disposed between the transverse webs 38 and 39.

The transverse webs 38 and 39 of the extruded stock 33 extend throughout the length thereof and respectively have enlarged free ends 43 and 44 offset inwardly from the respective side edges 36 and 37 of the mounting web 35, the enlarged ends 43 and 44 respectively defining inwardly tapering surfaces 45 and 46 at the ends of the transverse webs 38 and 39.

The enlarged end 43 of the transverse web 38 is provided with a substantially V-shaped groove 47 extending throughout the length of the transverse web 38, the groove 47 being offset inwardly from the normal plane of the transverse web 38 and having the tapering surface 45 on one side thereof and a flat surface 48 on the other side thereof.

The enlarged end 44 of the transverse web 39 is provided with a projection 49 extending outwardly therefrom throughout the length of the transverse web 39, the projection having a substantially V-shaped cross-sectional configuration and being offset inwardly from the normal plane of the transverse web 39 in a manner similar to the groove 47. The projection 49 and groove 47 of the base section stock 33 are complementary to each other, whereby the projection 49 of one base section cut from the stock 33 is adapted to be received in the groove 47 of another base section cut from the stock 33 in the manner illustrated in FIGURE 3. The projection 49 of the base section stock 33 is bounded on one side thereof by the tapering surface 46 and a flat surface 50 on the other side thereof, the flat surfaces 48 and 50 of the enlarged ends 43 and 44 lying in a plane disposed parallel to the plane of the mounting web 35.

After the base section stock 33 has been extruded in the above manner, the structural base 23 is formed therefrom by cutting the stock 33 into desired lengths to provide two identical base sections 31 and 32 as illustrated in FIGURE 3.

Thereafter, the cut base sections 31 and 32 are assembled together with the projection 49 of one of the base sections 31 or 32 being received in the groove 47 of the other base section 31 or 32 and with the adjacent pairs of flat surfaces 48 and 50 thereof disposed in abutting relation. When the base sections 31 and 32 are assembled together in this manner to form the structural base 23, the adjacent pairs of transverse webs 38, 39 interconnect together the mounting webs 35 of the base sections 31 and 32 in parallel and spaced relation by a pair of parallel and spaced transverse webs 51 and 52, each transverse web 51 and 52 being defined by the interconnected pair of transverse webs 38 and 39 of the base sections 31 and 32.

The transverse webs 51 and 52 cooperate with the mounting webs 35 to define a substantially rectangular tubular structure 53 extending throughout the length of the structural base 23 for a purpose hereinafter described.

When the base sections 31 and 32 are assembled together in the manner illustrated in FIGURE 3, the tapering surfaces 45 and 46 of each pair of adjacent transverse webs 38 and 39 define a longitudinal V-shaped groove 54 extending along the base 23 and facing outwardly between the respective opposed pair of mounting flanges 41, 42 overhanging the tubular structure 53.

The longitudinal grooves 54 of the base 23 receive suitable material 55 to secure the adjacent ends 43, 44 of adjacent transverse webs 38, 39 together to, thus, permanently secure the base sections 31 and 32 together. For example, the material 55 can be a suitable weld material or a suitable adhesive, such as an epoxy resin adhesive or the like. When the base sections 31 and 32 are formed of aluminum-containing metallic material, one such epoxy resin adhesive that has been satisfactory is EC-1595, manufactured by the Minnesota Mining and Manufacturing Company. Further, a suitable adhesive, such as the epoxy resin or the like, can be placed on one or both opposed ends 43 and 44 of the base sections 31 and 32, in addition to the weld or adhesive means 55 or in lieu thereof, as desired, to secure together the mating flat surfaces 48 and 50 thereof as well as secure the projections 49 in the respective grooves 47.

After the base sections 31 and 32 have been secured together in the above manner or before the same have been assembled together, the mounting webs 35 of the base sections are suitably machined to provide various apertures therein for the particular switching mechanism to be subsequently carried thereby. For example, the central portion of the mounting webs 35 of each base section 31 and 32 can be provided with bores 56, FIGURE 4, to permit the operating mechanism 30 of the insulator stack 25 to pass therethrough. The mounting flanges 41 and 42 of the mounting webs 35 of the base sections 31 and 32 can be suitably bored at 57 to provide means for bolting the insulator stacks 24-26 thereto. Similarly, the mounting flanges 41 and 42 can be bored at 58 at any feasible locations along the length thereof to provide means for bolting or otherwise fastening the structural base 23 to a supporting structure.

For example, both sets of opposed mounting flanges 41, 42 of the base 23 can be bored as illustrated in FIGURE 5 to permit the base 23 to be secured to the supporting structure 59 by bolts 60. Alternately only one mounting flange of each opposed pair 41, 42 thereof may be bored as illustrated in FIGURE 6 to permit the base 23 to be bolted to a supporting structure 61 by bolts 62 throughout the length of the structural base 23. The base 23 can overhang the supporting structure 59 as represented by the reference letter A in FIGURE 5 without having the structural base 23 deflect to an adverse degree should a short circuit condition exist in the switch carried thereby, whereby the short circuited switch would not be damaged by such minor deflection of the base 23. Greater amounts of overhang may be used for the structural bases of this invention because of the greater resistance to torsion provided for by the tubular cross section.

In addition, the mounting flanges 41 and 42 can be bored, as at 63, to provide means for connecting the various parts of the switch 10 to the base 23 to ground the same in a manner well known in the art when the switch 10 is opened.

Therefore, it can be seen that by providing outwardly directed flanges 41 and 42 on the structural base 23, various devices can be readily secured to the base 23 by simple bolting operations and the like, the under surfaces of the mounting flanges 41 and 42 being readily accessible from the exterior of the base 23.

While one embodiment of an air break switch 10 has been illustrated, it is to be understood that the same is merely emblematic of the various types of air break switches now on the market. Since various air break switches have one or more insulating stacks located in different positions relative to each other, the structural base 23 of this invention can be modified to accommodate each type of switch in a simple manner by merely relocating the mounting and securing aperture thereof in the proper position.

For example, a structural base 64 illustrated in FIGURE 7 has been constructed from the base section stock 33 of FIGURE 2 in the above manner and has various apertures formed therein to accommodate a three-insulator stack, air break, 115 kv. switch. The overall length of the base is approximately 8 feet 6 inches and is formed from an extruded base member stock 33 having a mounting web 35 of approximately 8½ inches wide and a thickness of approximately 5/32 of an inch between the transverse webs 38 and 39 thereof, the mounting flanges 41 and 42 of the stock 33 having a thickness of approximately 7/32 of an inch. The transverse webs 38 and 39 are approximately 5/32 of an inch thick and extend from the mounting webs 35 a distance of approximately 12¼/32 inches to make the overall height of the structural base 64 approximately 3 5/16 inches. The tapering surfaces 45 and 46 of the base sections 31 and 32 are disposed at acute angles of approximately 30° relative to the flat surfaces 48 and 50 thereof.

It has been found that the structural base 64 weighs approximately 43.3 pounds when formed of aluminum-containing metal. Thus not only is the structural base 64 able to withstand short-circuited torsional forces imposed thereon by the 115 kv. switch carried thereby so that the switch is not damaged, but also the structural base 64 is light-weight, non-corrosive, and relatively simple and inexpensive to manufacture. In a comparison test of the structural base 64 formed of aluminum-containing metal and a prior-known steel construction, it was found that the deflection of the steel base was ten times that of the structural base 64 under the same short-circuited conditions.

Therefore, not only did the structural base of this invention provide greater rigidity to torsional forces imposed thereon than the comparable steel base, but also the structural base of this invention had improved means for mounting the same to supporting structures through the flanges 41 and 42 thereof.

Another base section of this invention is illustrated in FIGURE 8 and is generally indicated by the reference numeral 65, the base section 65 being formed in substantially the same manner as the base sections 31 and 32 previously described except for variations hereinafter described.

In particular, the base section 65 includes a mounting web 66 having a pair of opposed end flanges 67 and 68 similar to the end flanges 41 and 42 and having a pair of transverse webs 69 and 70 formed in the same manner as the transverse webs 38 and 39 to permit joining together two base sections 65 to form a structural base having a rigid box-like or tubular structure extending throughout the length thereof.

However, the interior surface 71 of the mounting web 66 disposed between the transverse webs 69 and 70 slopes from the transverse webs 69 and 70 toward the exterior flat surface 72 thereof whereby any moisture collecting in the lower base section 65 of a structural base formed therefrom will collect or drain to the medial portion of the interior surface 71. By providing a plurality of drainage openings 73 in the mounting web 66 in the region of the medial portion thereof, such collected moisture can drain from the tubular structure of the structural base.

Since the drainage feature of the interior surface 71 of the base section 65 does not affect the outer mounting surface 72 thereof, a structural base can be formed from two base sections 65 with the lower section 65 thereof performing the drainage function. However, it is to be understood that a base section 65 can be combined with one of the base sections 31 and 32 previously described to form a structural base with the base section 65 forming the lower section thereof for drainage purposes.

While one of the purposes for arching the portion of the mounting web 66 disposed between the transverse webs 69 and 70 of the base section 65 is to provide moisture drainage means for a structural base formed therefrom, it has been found that such arching also increases the rigidity of the box-like or tubular structure of the structural base formed therefrom. Therefore, the rigidity of the tubular structure of a structural base formed from one or two base sections 65 is increased over the structural base 23 formed from the base sections 31 and 32. However, it is to be understood that the structural base 23 has sufficient rigidity to withstand deflections thereof during adverse short circuited conditions and the like.

Therefore, whether a structural base is formed from the base sections 31 or 64 or a combination thereof, it can be seen that the resulting base can be formed in a simple and easy manner by effective joining means provided between the adjacent ends of the transverse webs thereof whereby the resulting structural base has a rigid tubular or box-like structure extruding throughout the length thereof. Further, by merely extending the base section stock in a simple and effective manner as illustrated in FIGURE 2, the base sections 31 and 64 can be easily formed therefrom by simple sawing and boring operations.

However, while the base member stock has been illustrated as being extruded to produce the base sections 31 and 64 that can be assembled together in a simple and effective manner, it is to be understood that the base sections 31 and 64 can be formed in any other desired manner, such as by casting and the like.

Further, the structural bases formed therefrom, can be utilized for supporting structures other than air break switches or can be utilized solely as structural members, as desired.

While the structural bases of this invention have been described with reference to the loads encountered in short circuit conditions, it will be appreciated that other loads are present though usually not so severe as the short circuit load. These other loads include the load from the weight of the insulator stacks 24, 25 and 26, the load from the switch 20 itself, ice and snow loads which may accumulate on the switch, the base and on the insulator stacks, and wind loads. The tubular cross section of the bases of this invention provides superior performance under all of these loads.

While the form of the invention now preferred has been disclosed as required by the statutes, other forms may be used, all coming within the scope of the claims which follow.

What is claimed is:

1. In combination, a longitudinal structural base having a pair of spaced parallel mounting webs and a pair of spaced parallel transverse webs respectively interconnected to the facing surfaces of said mounting webs inboard of the side edges of said mounting webs whereby said base has a substantially rectangular tubular structure extending throughout the longitudinal length thereof and one of said mounting webs has mounting portions extending beyond said transverse webs, said mounting portions of said one mounting web being thicker than the portion thereof disposed intermediate said transverse webs, an air break switch disposed on said one mounting web of said base, said air break switch including stack means disposed in longitudinally aligned relation along the longitudinal axis of said mounting web and extending substantially perpendicular relative thereto, said air break switch including movable switch arm means for opening and closing said switch, said arm means extending across said stack means and being substantially parallel with the longitudinal axis of said base, and fastening means fastening said air break switch to only said mounting portions of said one mounting web outboard of said transverse webs whereby said interconnected base and switch minimize torsional forces imposed thereon during a short-circuited condition so that deflection in said base is minimized.

2. In combination, a longitudinal structural base having a pair of spaced parallel mounting webs and a pair of spaced parallel transverse webs respectively interconnected to the facing surfaces of said mounting webs inboard of the side edges of said mounting webs whereby said base has a substantially rectangular tubular structure extending throughout the longitudinal length thereof and one of said mounting webs has mounting portions extending beyond said transverse webs, said mounting portions of said one mounting web being thicker than the portion thereof disposed intermediate said transverse webs, an air break switch disposed on said one mounting web of said base, said air break switch including stack means disposed in longitudinally aligned relation along the longitudinal axis of said one mounting web and extending substantially perpendicular relative thereto, said air break switch including movable switch arm means for opening and closing said switch, said arm means extending across said stack means and being substantially parallel with the longitudinal axis of said base, fastening means fastening said air break switch to only said mounting portion of said one mounting web outboard of said transverse webs whereby said interconnected base and switch minimize torsional forces imposed thereon during a short-circuited condition so that deflection in said base is minimized, the other mounting web of said base having mounting portions extending beyond said transverse webs, said mounting portions of said other mounting web being thicker than the portion thereof disposed intermediate said transverse webs, a supporting frame means, and fastening means fastening said frame means to only said mounting portions of said other mounting web.

3. A combination as set forth in claim 2 wherein said frame means includes a plurality of spaced parallel support members and said base is fastened to said support members while being disposed at right angles relative thereto.

4. A combination as set forth in claim 2 wherein said intermediate portion of said other mounting flange has a concave facing surface and aperture means passing therethrough at the bottom of said concave surface to provide drainage means for said tubular structure.

5. In combination, a longitudinal structural base having a pair of spaced parallel mounting webs and a pair of spaced parallel transverse webs respectively interconnected to the facing surfaces of said mounting webs inboard of the side edges of said mounting webs whereby said base has a substantially rectangular tubular structure extending throughout the longitudinal length thereof and one of said mounting webs has mounting portions extending beyond said transverse webs, said mounting portions of said one mounting web being thicker than the portion thereof disposed intermediate said transverse webs, an air break switch disposed on said one mounting web of said base, said air break switch including stack means disposed in longitudinally aligned relation along the longitudinal axis of said one mounting web and extending substantially perpendicular relative thereto, said air break switch including movable switch arm means for opening and closing said switch, said arm means extending across said stack means and being substantially parallel with the longitudinal axis of said base, and fastening means fastening said air break switch to only said mounting portions of said one mounting web outboard of said transverse webs whereby said interconnected base and switch minimize torsional forces imposed thereon during a short-circuited condition so that deflection in said base is minimized, said base being formed of two like base sections, each base section including one of said mounting webs and parts of said transverse webs interconnected to said parts of said transverse webs of the other base section.

6. A combination as set forth in claim 5 wherein said parts of said transverse webs are interconnected by welds.

7. A combination as set forth in claim 5 wherein said parts of said transverse webs are interconnected by adhesive.

8. In combination, a longitudinal structural base having a pair of spaced parallel mounting webs and a pair of spaced parallel transverse webs respectively interconnected to the facing surfaces of said mounting webs inboard of the side edges of said mounting webs whereby said base has a substantially rectangular tubular structure extending throughout the longitudinal length thereof and one of said mounting webs has mounting portions extending beyond said transverse webs, said mounting portions of said one mounting web being thicker than the portion thereof designed intermediate said transverse webs, an air break switch disposed on said one mounting web of said base, said air break switch including stack means disposed in longitudinally aligned relation along the longitudinal axis of said one mounting web and extending substantially perpendicular relative thereto, said air break switch including movable switch arm means for opening and closing said switch, said arm means extending across said stack means and being substantially parallel with the longitudinal axis of said base, and fastening means fastening said air break switch to only said mounting portions of said one mounting web outboard of said transverse webs whereby said interconnected base and switch minimize torsional forces imposed thereon during a short-circuited condition so that deflection in said base is minimized, said base being formed of two like base sections, each base section including one of said mounting webs and parts of said transverse webs interconnected to said parts of said transverse webs of the other base section, one part of said transverse webs of each pair of parts having an end provided with a projection therefrom throughout its length, the other part of said transverse webs of each pair of parts having an end provided with a groove therein and receiving said projection of said one part of the other base section.

9. In combination, a longitudinal structural base having a pair of spaced parallel mounting webs and a pair of spaced parallel transverse webs respectively interconnected to the facing surfaces of said mounting webs inboard of the side edges of said mounting webs whereby said base has a substantially rectangular tubular structure extending throughout the longitudinal length thereof and one of said mounting webs has mounting portions extending beyond said transverse webs, said mounting portions of said one mounting web being thicker than the portion thereoof disposed intermediate said transverse webs, an air break switch disposed on said one mounting web of said base, said air break switch including stack means disposed in longitudinally aligned relation along the longitudinal axis of said one mounting web and extending substantially perpendicular relative thereto, said air break switch including movable switch arm means for opening and closing said switch, said arm means extending across said stack means and being substantially parallel with the longitudinal axis of said base, and fastening means fastening said air break switch to only said mounting portions of said one mounting web outboard of said transverse webs whereby said interconnected base and switch minimize torsional forces imposed thereon during a short-circuited condition so that deflection in said base is minimized, said base being formed of two like base sections, each base section including one of said mounting webs and parts of said transverse webs interconnected to said parts of said transverse webs of the other base section, one part of said transverse webs of each pair of parts having an enlarged end offset relative to its adjacent side edge of its mounting web and being provided with a projection extending therefrom throughout the length of said part, the other part of said transverse webs of each pair of parts having an enlarged end offset relative to its adjacent side edge of its mounting web and being provided with a groove therein receiving said projection of said one part of the other base section.

10. A combination as set forth in claim 9 wherein said projections and said grooves of said parts each has a substantially V-shaped cross-sectional configuration.

11. A combination as set forth in claim 9 wherein said interconnected ends of said parts define a groove facing away from the other interconnected ends, and means disposed in said last-named grooves to secure said base sections together.

References Cited by the Examiner
UNITED STATES PATENTS

| | | |
|---|---|---|
| 2,316,844 | 4/1943 | Cornell et al. _____ 200—48 |
| 2,849,554 | 8/1958 | Curtis et al. _____ 200—48 |

FOREIGN PATENTS

| | | |
|---|---|---|
| 856,010 | 3/1940 | France. |
| 247,885 | 2/1926 | Great Britain. |
| 501,414 | 2/1939 | Great Britain. |

FRANK L. ABBOTT, *Primary Examiner.*

M. O. WARNECKE, *Assistant Examiner.*